US010559170B2

(12) United States Patent
Day et al.

(10) Patent No.: US 10,559,170 B2
(45) Date of Patent: Feb. 11, 2020

(54) ADJUSTABLE POCKET DEVICE FOR NOTE DISPENSING AND RECEIVING

(71) Applicant: NCR Corporation, Atlanta, GA (US)

(72) Inventors: Phil Noel Day, Fife (GB); Gordon Burke, Angus (GB); Scott Cruickshanks, Fife (GB); Ian McFarlane Denny, Perth (GB); David Heighton, Fife (GB); Lukasz Kaczmaryn, Dundee (GB); Marshall Munro, Dunfermline (GB); Andrew W. Smith, Dundee (GB); Grant William Smith, Dundee (GB); Stephen W. Swaine, Perth (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/940,815

(22) Filed: Mar. 29, 2018

(65) Prior Publication Data

US 2019/0304262 A1 Oct. 3, 2019

(51) Int. Cl.
*G06F 17/00* (2019.01)
*G07F 19/00* (2006.01)
*G07D 11/16* (2019.01)

(52) U.S. Cl.
CPC ........... *G07F 19/203* (2013.01); *G07D 11/16* (2019.01); *G07F 19/205* (2013.01)

(58) Field of Classification Search
CPC ........................... G06Q 20/1085; G06Q 20/20
USPC ................................ 235/379, 380, 382, 385
See application file for complete search history.

(56) References Cited

U.S. PATENT DOCUMENTS

| | | | | |
|---|---|---|---|---|
| 9,643,785 | B2 * | 5/2017 | Carlisle | G07F 19/20 |
| 2014/0131163 | A1 * | 5/2014 | Yun | G07F 19/202 194/206 |
| 2014/0151272 | A1 * | 6/2014 | Angus | G07F 19/202 209/3.1 |

* cited by examiner

*Primary Examiner* — Daniel St Cyr
(74) *Attorney, Agent, or Firm* — Schwegman, Lundberg & Woessner

(57) ABSTRACT

Various embodiments herein include a pocket to receive tendered notes and to dispense notes from a terminal, such as an automated teller machine. The pocket may include a shutter, a lifter opposite the shutter, a pusher plate between and perpendicular to the shutter and lifter, and a ceiling clamp. The pocket also includes a controller causes the terminal to perform actions when dispensing notes including moving the ceiling clamp to an open position and providing an output triggering dispensing of notes into the pocket. The actions further include moving the ceiling clamp to a closed position, moving the pusher plate to bias notes present within the pocket against the ceiling clamp and raising the lifter from a lower position to an upper position thereby lifting notes present between the pusher plate and the ceiling clamp. The shutter is then opened to expose and dispense the notes.

19 Claims, 7 Drawing Sheets

ADJUSTABLE POCKET DEVICE FOR NOTE DISPENSING AND RECEIVING

BACKGROUND INFORMATION

In self-service terminals, note dispensing and receiving pockets present convenience to customers by allowing them to place a bundle of notes in the pocket for deposit without use of an envelope. Pockets also allow for tendering and presenting notes to customers with mitigated environmental risks, such as wind blowing notes around. Pockets can also conceal notes that are tendered and dispensed to help with customer security. However, experience has shown that some customers are reluctant to put their hand inside the cavity of a pocket out of concern a shutter may close thereon. Further, certain terminal placements present accessibility concerns as the inside of the pocket, and even the pocket in the entirety, may not be visible (i.e., when seated in a wheelchair). Thus, despite the benefits provided at terminals by pockets, current pockets present other issues for at least some customers.

SUMMARY

Various embodiments herein include a pocket to receive tendered notes and to dispense notes from a terminal, such as an automated teller machine. The pocket may include a shutter, a lifter opposite the shutter, a pusher plate between and perpendicular to the shutter and lifter, and a ceiling clamp. The pocket also includes a controller causes the terminal to perform actions when dispensing notes including moving the ceiling clamp to an open position and providing an output triggering dispensing of notes into the pocket. The actions further include moving the ceiling clamp to a closed position, moving the pusher plate to bias notes present within the pocket against the ceiling clamp and raising the lifter from a lower position to an upper position thereby lifting notes present between the pusher plate and the ceiling clamp. The shutter is then opened to expose and dispense the notes.

DETAILED DESCRIPTION

Figure 1:
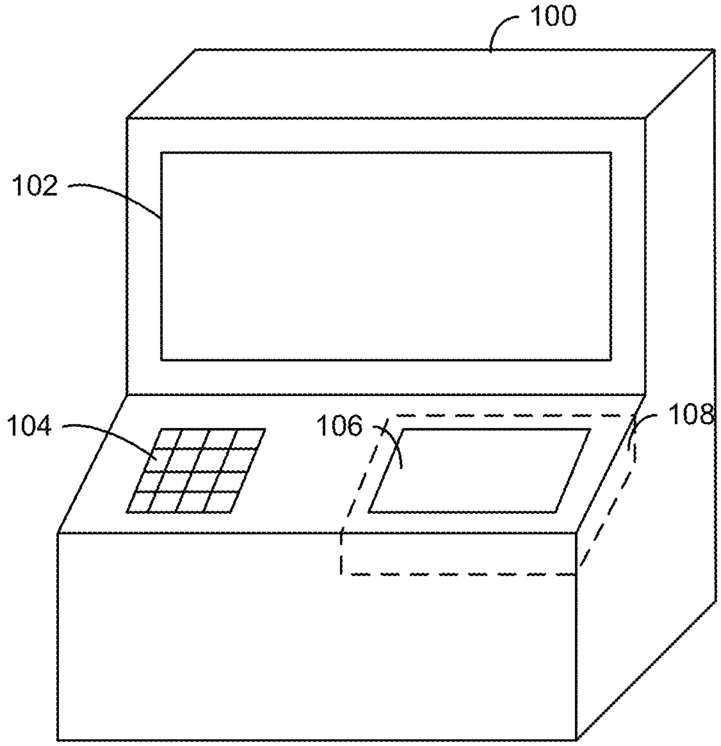
FIG. 1 is an illustration of an ATM, according to an example embodiment.

Terminals, such as automated teller machines (ATMs), self-service checkouts (SSCOs), and other self-service terminals (SSTs) that utilize currency recyclers often include a pocket, or cavity, within which notes are received and dispensed, such as ATM deposits and withdrawals, respectively. Note visibility and protrusion are strong predictors of customer usability as visibility enables customers of all eye-heights to know notes have been dispensed and protrusion allows all people to grasp the notes. At the same time, protrusion prevents customers from having to insert a hand inside the cavity as discussed above.

The various embodiments illustrated and described herein present an adjustable pocket device for note dispensing and receiving and methods of operation thereof.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms that control operation of the terminals and associated devices therein including the adjustable pocket device for note dispensing and receiving described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an illustration of an ATM 100, according to an example embodiment. The ATM 100 is provided as an example of a terminal that includes a picker and stacker unit 108 within which notes, such as currency and checks, may be deposited and dispense by a terminal. The ATM includes an input device, such as a display 102, a Personal Identification Number (PIN) pad 104 input device, and the like. The picking and stacking unit 108 in the embodiments herein generally includes a pocket 106 within which notes may be placed when tendered without being within an envelope as with traditional ATMs and other terminals. Notes may also be picked into the pocket 106 for dispensing. The pocket 106 may be present and located within the picker and stacker unit 108 and thereby also the ATM 100 do minimize area consumed by deposit and dispensing locations where the display 102 is otherwise located. This allows the display 102 to be larger to provide greater accessibility options and ability, such as for the sight-challenged. The pocket 106 may also be located in some embodiments to provide greater reach and viewing to increase accessibility for the wheelchair bound, among others.

Figure 2:
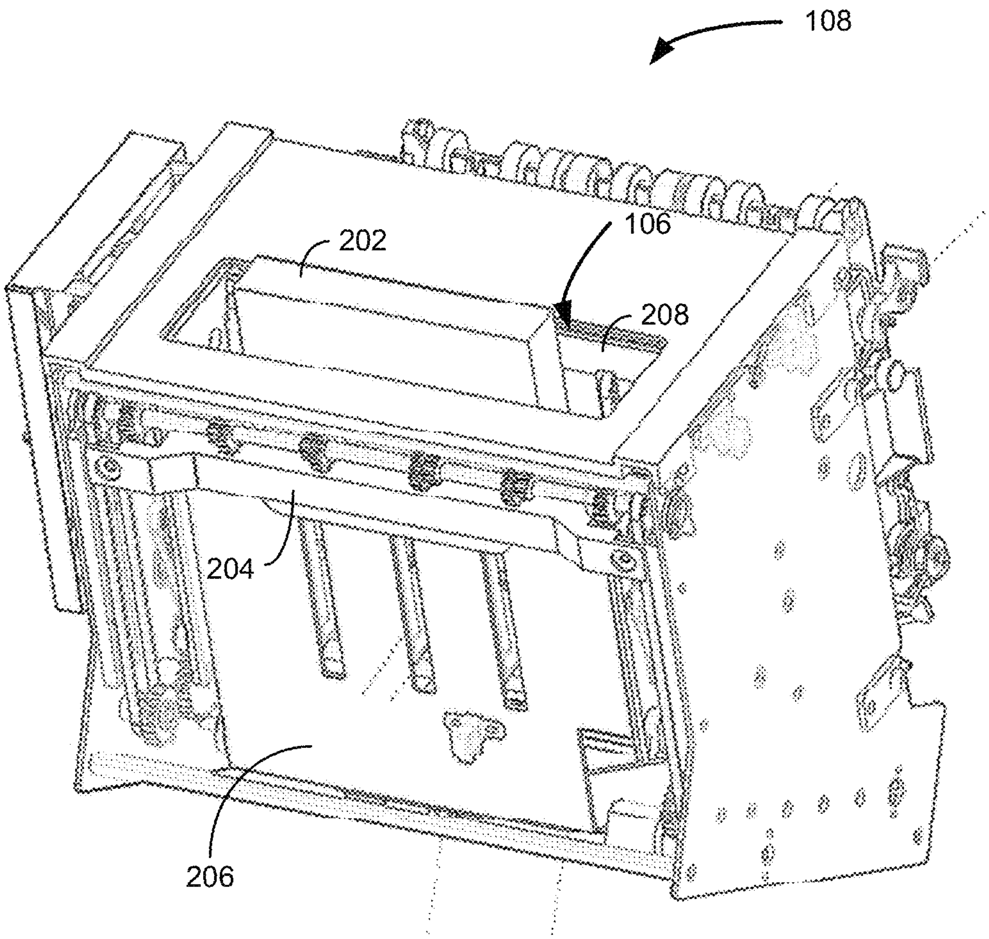
FIG. 2 is a perspective view of a terminal picker and stacker unit, according to an example embodiment.

FIG. 2 is a perspective view of a terminal picker and stacker unit 108, according to an example embodiment. The pocket 106 is present within the terminal picker and stacker unity 108 and is adjustable in size to manipulate notes that are placed therein. The pocket 108 has a base formed by a lifter 204, opposing sidewalls formed by a pusher plate 206 and a ceiling clamp 208, and outside end-walls formed by a housing of the picker and stacking unit 108 or otherwise by elements thereof. The ceiling clamp opens and closes to allow notes to be added to or removed from the pocket 106. When the ceiling clamp 208 is in a closed position, currency present within the pocket 106 may be bunched by operation of the pocket by moving the pusher plate 206 to bias the pusher plate 206 against the ceiling clamp 108 within the notes bunched therebetween to for a note bunch 202. When the picker and stacker unit 108 is performing a dispensing operation, the lifter 204 may then rise, thereby lifting the note bunch 202 up through a top of the pocket 106 once a top shutter (not shown in FIG. 2) has opened. The note bunch 202 is then easily viewable and can be secured by a customer hand and removed. In some embodiments, the lifter 206 when lifting the note bunch may be assisted or substituted for this lifting operation by belted conveyors (not illustrated) that are present in some embodiments on the surfaces of the ceiling claim 208 and the pusher plate 206.

Figure 3:
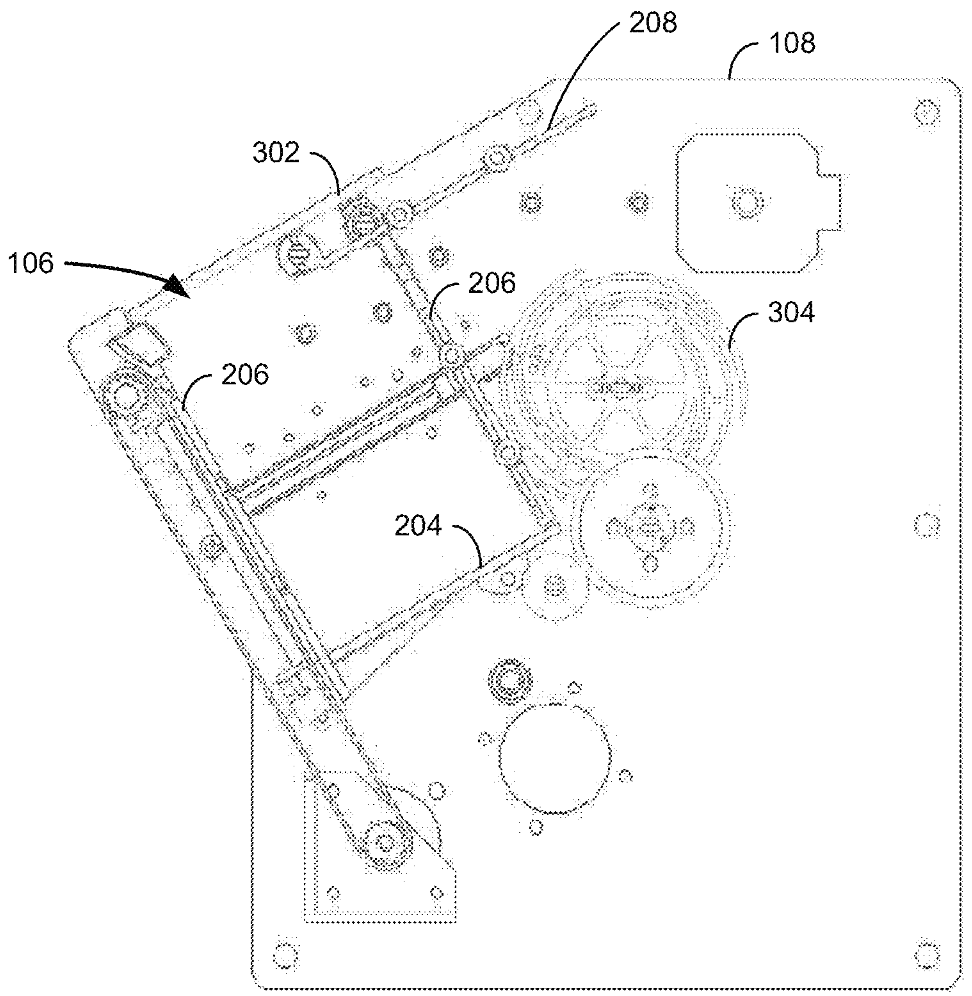
FIG. 3 is a side, internal perspective of a terminal picking and stacking unit, according to an example embodiment.

FIG. 3 is a side, internal perspective of a terminal picking and stacking unit 108, according to an example embodiment. FIG. 3 includes two additional elements not illustrated in FIG. 2. These elements are the shutter 302 that in the illustrated embodiment of FIG. 3 slides forward and back and picker and stacker 304. As illustrated the shutter 302 is in the forward, closed position. The picker and stacker 304 operates to pick notes from currency cassettes or other currency store in a terminal and place them in the pocket 106. The picker and stacker 304 also operates to remove notes from the pocket 106 and place them in a deposit bin, a recycler bin, or provide the notes to another device for one or more of sorting, stacking, processing, and the like.

Figure 4:
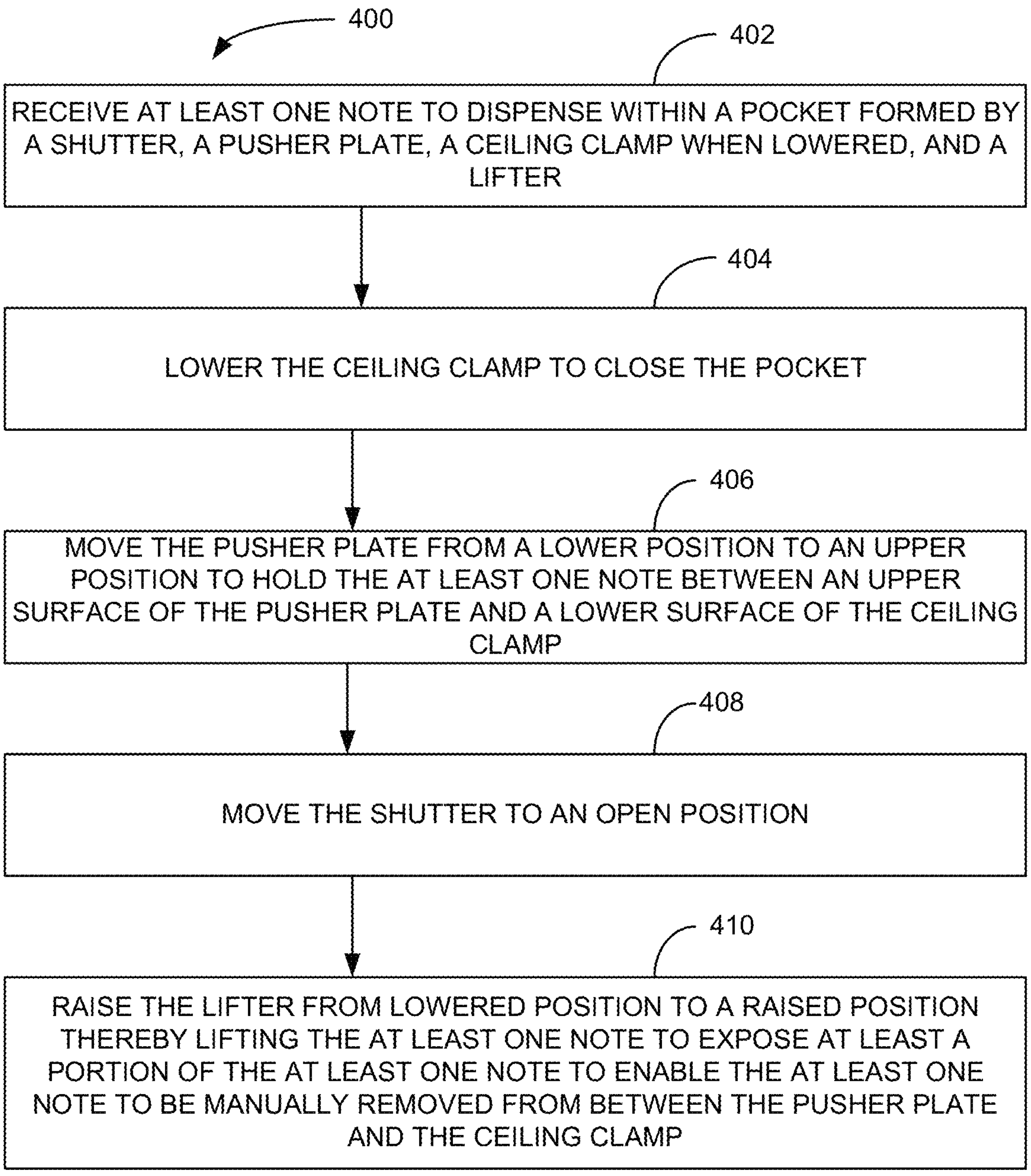
FIG. 4 is a block flow diagram of a method, according to an example embodiment.

FIG. 4 is a block flow diagram of a method 400, according to an example embodiment. The method 400 is an example of a method that may be performed by a picker and stacker unit, such as picker and stacker unit 108 of FIG. 1 et. seq. under the control of one or more of a picker and stacker unit controller and a computing device controlling operation of a terminal, such as ATM 100, within which the picker and stacker unit is deployed.

The method 400 includes receiving 402 at least one note to dispense within a pocket formed by a shutter, a pusher plate, a ceiling clamp when lowered, and a lifter. The method 400 further includes lowering 404 the ceiling clamp to close the pocket and moving 406 the pusher plate from a lower position to an upper position to hold the at least one note between an upper surface of the pusher plate and a lower surface of the ceiling clamp. The method 400 may then move 408 the shutter to an open position. Subsequently the method 400 includes raising 410 the lifter from lowered position to a raised position thereby lifting the at least one note to expose at least a portion of the at least one note to enable the at least one note to be manually removed from between the pusher plate and the ceiling clamp. In other embodiments, the lifting is instead or also performed by conveying belts or wheels that disposed on a surface of one or both of the ceiling clamp and pusher plate that are inward facing to the pocket.

In some embodiments of the method 400, lowering 404 the ceiling clamp includes rotating the ceiling clamp along an upper, proximal edge to move an opposite, distal edge to a lower position proximate to the lifter in the lowered position. In another embodiment, a wall of the pocket formed by the ceiling clamp when in the lowered position is instead open when the ceiling clamp is in a raised position. In such embodiments, the wall when open exposes a mechanism that places the at least one note in the pocket. This mechanism that places the at least one note in the pocket is also a note picker to pick notes from the pocket.

Figure 5:
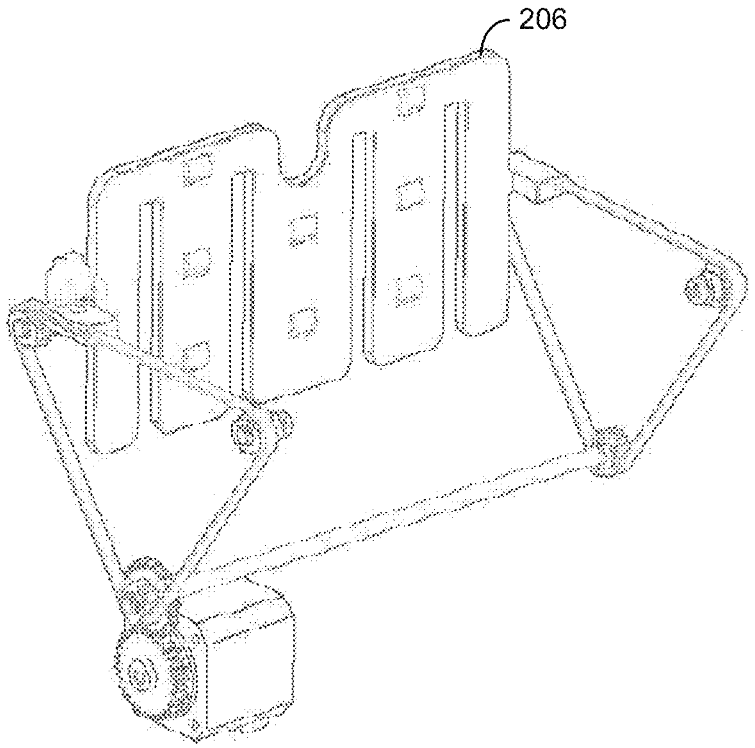
FIG. 5 illustrates a pusher plate, according to an example embodiment.

In some other embodiments, the lifter includes a spine along a proximal edge and a plurality of fingers extending outward perpendicularly from the proximal edge with distal ends of the fingers. Also, the pusher plate may include a plural number of voids formed therein that are equal in number and located according to the number and location of the plurality of fingers of the lifter such that the plurality of fingers fit and move within the number of voids when the pusher plate is moved between the lower and upper positions and when the lifter is raised and lowered. FIG. 5 illustrates a pusher plate 206, according to such an example embodiment.

In some embodiments, the pocket may also include one or both of a light and a camera. When present, the light illuminates when the shutter opens such that a customer may better see inside the pocket. In these and some other embodiment that include a camera, the camera captures a view of the inside of the pocket and that view is presented on a display of the terminal. This view can be when the pocket is open and, in some embodiments, even at some times when the pocket is closed to provide a customer of notes being added to or removed from the pocket.

In some embodiments, as will be discussed later, the shutter may take different forms. As such, opening and closing the shutter may be different in various embodiments, such as rotating the pocket, opening two portions of the pocket to provide easier access or viewing, and the like. Further, in some embodiments, some portions of the pocket may be transparent, such as the shutter and even other areas such as a front lip area, to enable customers to view inside the pocket. Some such examples are illustrated in FIG. 6.

Figure 6:
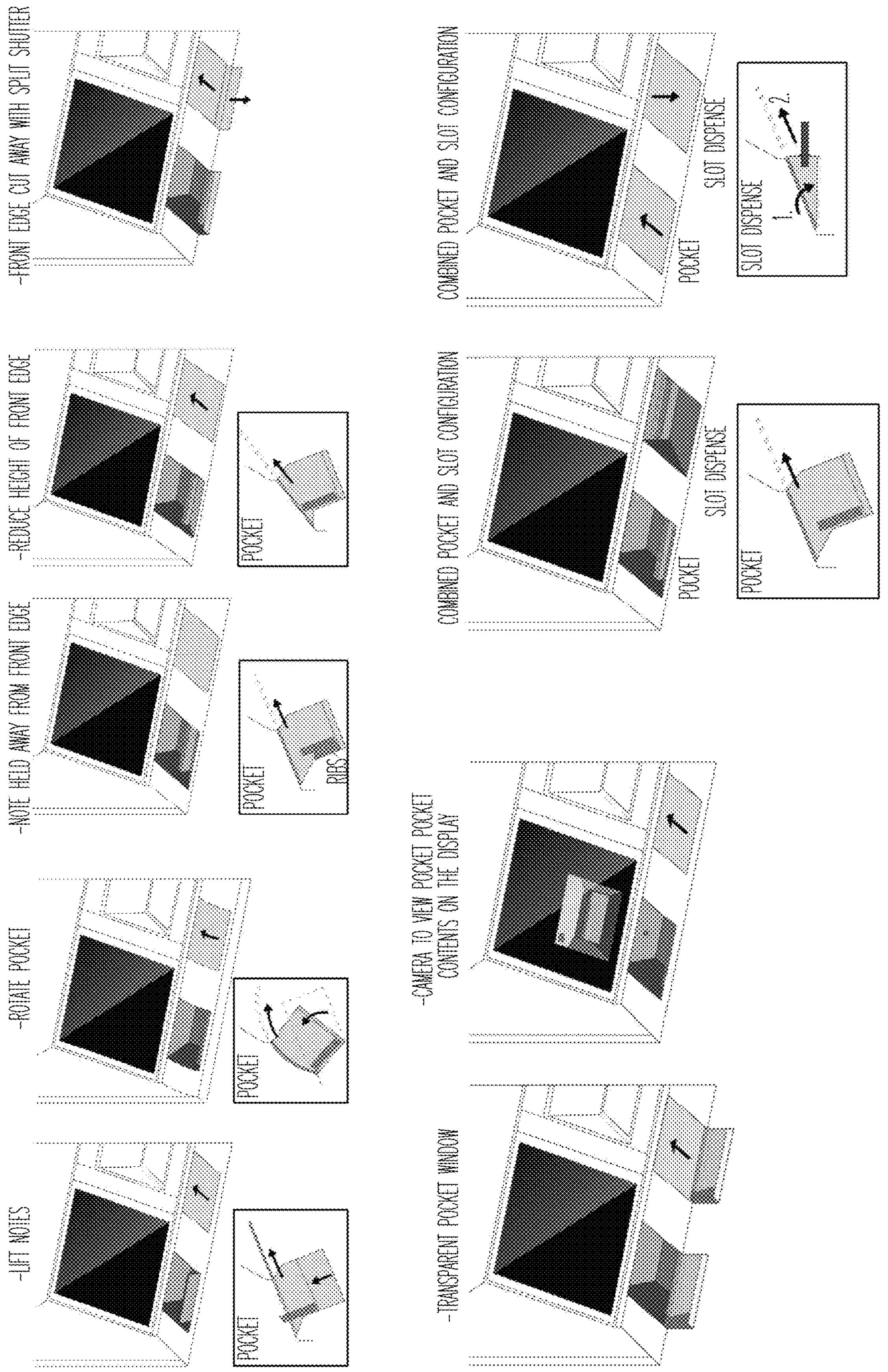
FIG. 6 includes deposit and dispense arrangements according to a plurality of example embodiments.

FIG. 6 includes deposit and dispense arrangements according to a plurality of example embodiments.

Figure 7:
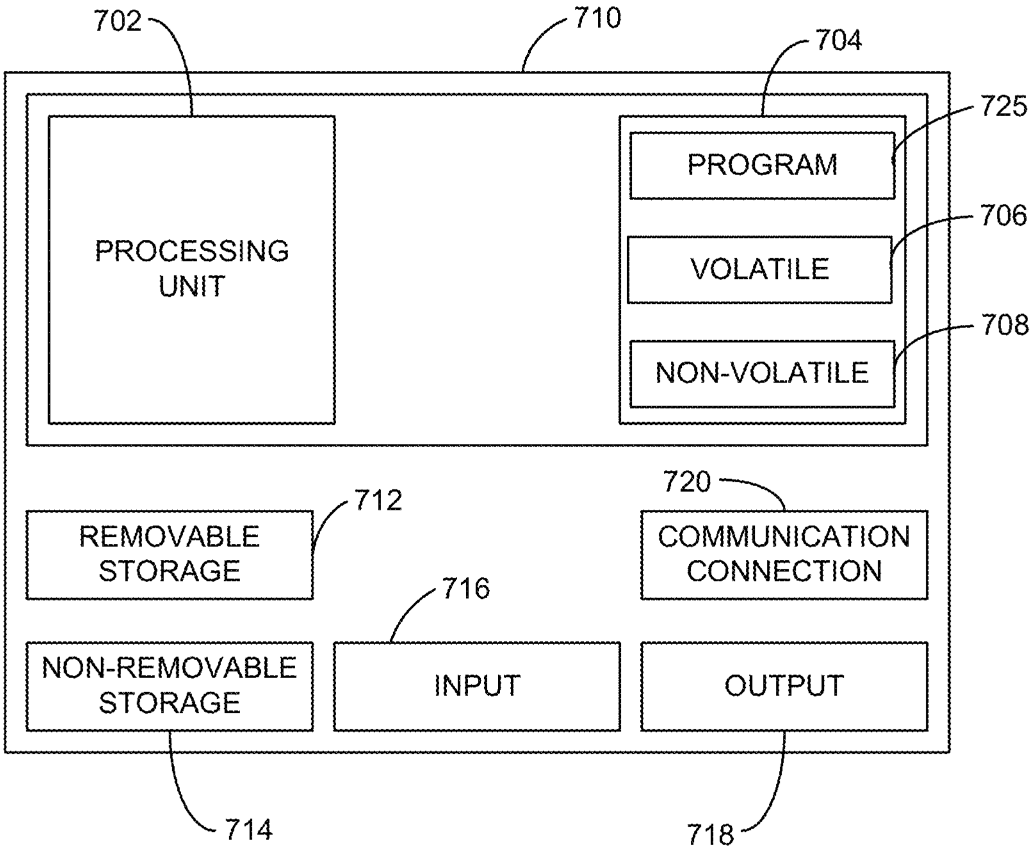
FIG. 7 is a block diagram of a computing device, according to an example embodiment.

FIG. 7 is a block diagram of a computing device, according to an example embodiment. The computing device, in some embodiments, is utilized to control operation of a terminal or a portion thereof, such as an ATM or a note and stacking unit 108 of FIG. 1 and elsewhere herein. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Although the example computing device is illustrated and described as computer 710, the computing device may be in different forms in different embodiments. For example, the computing device may instead be a smartphone, a tablet, smartwatch, or other computing device including the same or similar elements as illustrated and described with regard to FIG. 7. Devices such as smartphones, tablets, and smartwatches are generally collectively referred to as mobile devices. Further, although the various data storage elements are illustrated as part of the computer 710, the storage may also or alternatively include cloud-based storage accessible via a network, such as the Internet.

Returning to the computer 710, memory 704 may include volatile memory 706 and non-volatile memory 708. Computer 710 may include or have access to a computing environment that includes a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 710 may include or have access to a computing environment that includes input 716, output 718, and a communication connection 720. The input 716 may include one or more of a touchscreen, touchpad, mouse, keyboard, camera, one or more device-specific buttons, one or more sensors integrated within or coupled via wired or wireless data connections to the computer 710, and other input devices. The computer 710 may operate in a networked environment using a communication connection 720 to connect to one or more remote computers, such as database servers, web servers, and other computing device. An example remote computer may include a personal computer (PC), server, router, network PC, a peer device or other common network node, or the like. The communication connection 720 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 720 may also or alternatively include a transceiver device, such as a BLUETOOTH® device that enables the computer 710 to wirelessly receive data from and transmit data to other BLUETOOTH® devices.

Computer-readable instructions stored on a computer-readable medium are executable by the processing unit 702 of the computer 710. A hard drive (magnetic disk or solid state), CD-ROM, and RAM are some examples of articles including a non-transitory computer-readable medium. For example, various computer programs 725 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving at least one note to dispense within a pocket formed by a shutter, a pusher plate, a ceiling clamp when lowered, and a lifter;

lowering the ceiling clamp to close the pocket;

moving the pusher plate from a lower position to an upper position to hold the at least one note between an upper surface of the pusher plate and a lower surface of the ceiling clamp;

moving the shutter to an open position; and raising the lifter from lowered position to a raised position thereby lifting the at least one note to expose at least a portion of the at least one note to enable the at least one note to be manually removed from between the pusher plate and the ceiling clamp; and wherein:

the lifter includes a spine along a proximal edge and a plurality of fingers extending outward perpendicularly from the proximal edge with distal ends of the fingers; and the pusher plate includes a plural number of voids formed therein that are equal in number and located according to the number and location of the plurality of fingers of the lifter such that the plurality of fingers fit and move within the number of voids when the pusher plate is moved between the lower and upper positions and when the lifter is raised and lowered.

2. The method of claim 1, wherein lowering the ceiling clamp includes rotating the ceiling clamp along an upper, proximal edge to move an opposite, distal edge to a lower position proximate to the lifter in the lowered position.

3. The method of claim 1, wherein a wall of the pocket formed by the ceiling clamp when in the lowered position is instead open when the ceiling clamp is in a raised position, the wall when open exposes a mechanism that places the at least one note in the pocket.

4. The method of claim 3, wherein the mechanism that places the at least one note in the pocket is also a note picker to pick notes from the pocket.

5. The method of claim 1, further comprising:

illuminating the pocket when the shutter is in the open position.

6. The method of claim 1, wherein the method is performed by a self-service terminal (SST).

7. The method of claim 6, wherein the SST is an automated teller machine (ATM).

8. The method of claim 1, wherein moving the shutter to the open position includes rotating the pocket to an outwardly exposed position.

9. The method of claim 1, wherein the at least one note is a currency note.

10. A terminal comprising:

a shutter forming an upper surface of a pocket that exposes an inside of the pocket outwardly from the terminal when the pocket it opened;

a lifter opposite the shutter and forming a lower surface of the pocket;

a pusher plate between and perpendicular to the shutter and lifter forming a first perpendicular surface of the pocket;

a ceiling clamp, when in a closed position opposite the pusher plate between and perpendicular to the shutter and lifter forming a second perpendicular surface of the pocket and when in an open position exposing an inside of the pocket internally to the terminal to a note dispensing and picking mechanism that inserts and removes notes from the pocket;

a controller to control operation of the pocket, the controller when dispensing notes operable cause the terminal to perform actions comprising:

moving the ceiling clamp to the open position;

providing an output indicating the pocket is in the open position such that the note dispensing and picking mechanism can then dispense notes into the pocket;

moving the ceiling clamp to the closed position;

moving the pusher plate forward to secure notes present within the pocket with a force biased against the ceiling clamp;

raising the lifter from a lower position to an upper position thereby lifting notes present between the pusher plate and the ceiling clamp; and opening the shutter; and wherein:

the lifter includes a spine along a proximal edge and a plurality of fingers extending outward perpendicularly from the proximal edge with distal ends of the fingers; and the pusher plate includes a plural number of voids formed therein that are equal in number and located according to the number and location of the plurality of fingers of the lifter such that the plurality of fingers fit and move within the number of voids when the pusher plate is moved between the lower and upper positions and when the lifter is raised and lowered.

11. The terminal of claim 10, further comprising:

further raising the litter to expose a portion of the notes from between the pusher plate and the ceiling clamp to allow manual removal of the notes from therebetween.

12. The terminal of claim 10, further comprising:

a light internal to the pocket; and the controller, upon opening the shutter, illuminates the light.

13. The terminal of claim 11, further comprising:

a display device;

a camera positioned to capture a view of an inside of the pocket when the shutter is open; and the controller, upon opening and illuminating the light, captures images with the camera and provides the images for presentation on the display device.

14. The terminal of claim 10, wherein the controller, when controlling operation of the pocket to receive tendered notes, causes the terminal to perform actions comprising:

opening the shutter;

closing the shutter upon receipt of an indicating notes have been received;

moving the pusher plate forward to secure notes present within the pocket with a force biased against the ceiling clamp;

moving the ceiling clamp to the open position; and instructing the note dispensing and picking mechanism to pick notes from the pocket.

15. The terminal of claim 14, wherein the controller, when controlling operation of the pocket to receive tendered notes, causes the terminal to perform further actions comprising:

raising the lifter prior to opening the shutter; and lowering the lifter after closing the shutter and before moving the ceiling clamp to the open position.

16. The terminal claim 14, wherein the pocket is oriented such that notes, when placed in or picked into the pocket lay flat upon the pusher plate.

17. The terminal of claim 15, wherein at least one received note is a check.

18. The terminal of claim 10, wherein the notes include currency notes.

19. The terminal of claim 10, wherein the terminal is an automated teller machine (ATM).

* * * * *